United States Patent [19]
Lee

[11] Patent Number: 5,090,613
[45] Date of Patent: Feb. 25, 1992

[54] METHOD OF MANUFACTURING AN ANODE ASSEMBLY OF A MAGNETRON

[75] Inventor: Sang Sung Lee, Kyungsangbuk, Rep. of Korea

[73] Assignee: Gold Star Co., Ltd., Seoul, Rep. of Korea

[21] Appl. No.: 703,362

[22] Filed: May 21, 1991

[30] Foreign Application Priority Data

May 31, 1990 [KR] Rep. of Korea ............... 7922/1990

[51] Int. Cl.⁵ .............................................. B23K 1/00
[52] U.S. Cl. ..................................... 228/254; 445/35
[58] Field of Search .................... 228/254; 445/35, 36

[56] References Cited

U.S. PATENT DOCUMENTS

| | | | |
|---|---|---|---|
| 2,445,766 | 7/1948 | Derby et al. | 228/254 X |
| 2,645,843 | 7/1953 | Nordsieck | 228/254 X |
| 3,550,234 | 12/1970 | Herold | 228/254 X |
| 4,997,123 | 3/1991 | Backus et al. | 228/254 X |

Primary Examiner—Kenneth J. Ramsey
Attorney, Agent, or Firm—Charles Berman, Esq.

[57] ABSTRACT

This invention relates to an improved method of manufacturing an anode assembly of a magnetron used in a microwave oven to generate an electromagnetic wave for cooking foodstuffs therein. The method comprises coating of entire surfaces of vanes with a brazing material to join an anode cylinder, upper and lower strip rings and an antenna lead contacting the vanes by the coated brazing material on the vanes, whereby enhanced efficiency of a production process, mass production and reduction in costs may be achieved.

2 Claims, 3 Drawing Sheets

FIG. 5
FIG. 6
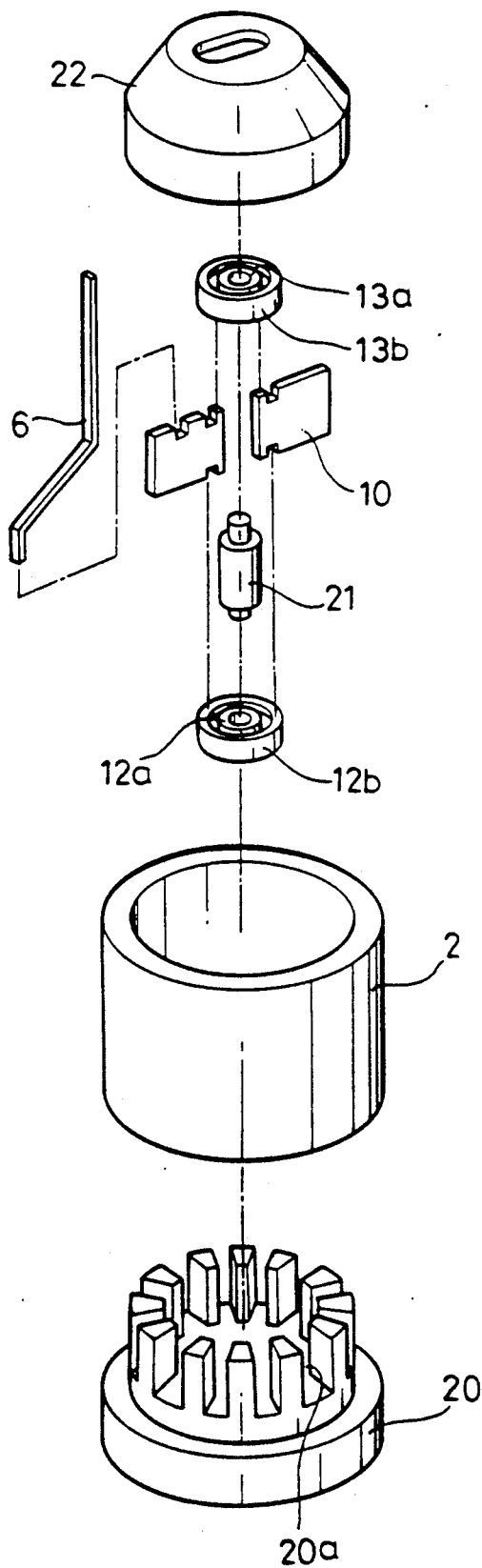
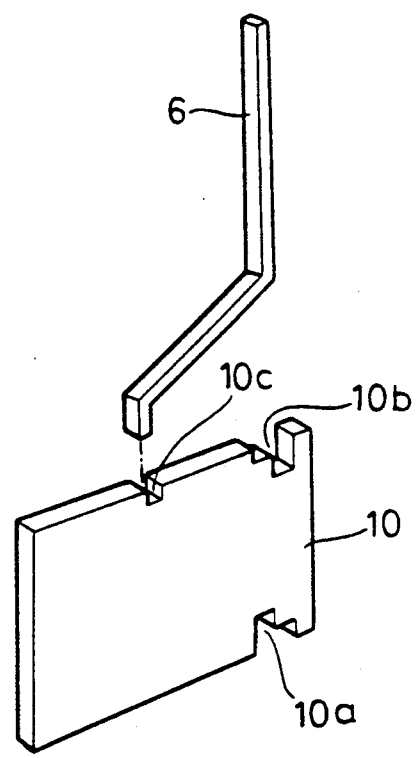

METHOD OF MANUFACTURING AN ANODE ASSEMBLY OF A MAGNETRON

BACKGROUND OF THE INVENTION

1. Field of the Invention

This invention relates to a method of manufacturing an anode assembly of a magnetron used in a microwave oven, which is usually referred to as an electronic range, to generate an electromagnetic wave for cooking foodstuffs therein, and in particular a method of manufacturing such an anode assembly by assembling vanes, an antenna lead, upper and lower strip rings and an anode cylinder together.

2. Description of the Prior Art

Generally, a magnetron is of a type as shown in FIG. 1 of the accompanying drawings and is a kind of a diode comprising a direct-heated filament (referred to as a cathode) (1) disposed axially at its central position and an anode cylinder (referred to as an anode) (2) which is an anode structure mounted in a radially outwardly spaced, surrounding relation to the cathode. In addition, the magnetron is provided with a magnetic circuit comprising a yoke(3), a magnet(4) and a magnetic pole(5) and applying magnetic flux into a space between the filament(1) and the anode cylinder(2), an output section comprising an antenna lead(6), an antenna seal(7), an antenna ceramics(8) and an antenna cap(9) and emitting microwave energy transferred to the anode cylinder(2) to the exterior of the magnetron, radiatin fins(11) for radiating heat generated due to collision of thermions with vanes(10) in the anode cylinder(2), and a filter circuit for preventing an unnecessary high frequency component produced in an action space from back-flowing to a power source.

In such a magnetron, the thermions emitted from the filament(1) effect a cycloidal movement as they are subject to the force of an electric field induced between the vanes(10) and the filament(1) and the magnetic flux applied into the space between the filament(1) and the anode cylinder(2) by the magnetic pole(5) of the magnetic circuit. The accelerated thermions generate the microwave energy which will be received by the vanes is emitted through the antenna lead(6) of the output section to the exterior of the magnetron to heat the foodstuffs placed within the microwave oven. In particular, there is mounted in a radially outwardly spaced, surrounding relation to the filament or the cathode an assembly generically referred to as an anode assembly comprised of the anode cylinder(2) of a circular cross-sectional configuration, a plurality of the vanes(10) arranged radially within the anode cylinder(2), upper and lower strip rings(12,13), each engaged with each of the upper and lower sides of the radially arranged vanes (10), and the antenna lead(6) coupled to one of the vanes, as shown in FIG. 2.

As will be described below with reference to FIGS. 3 and 4, a prior method of manufacturing the anode assembly as described above comprises the steps of:

(a) providing a plurality of rectangular plate vanes(10), each having upper and lower ring-receiving grooves(10b,10a) formed in its upper and lower sides, one of the vanes having a lead-receiving groove(10c) formed at an approximately central portion of its upper side, (b) forming a lower strip ring having inner and outer ring portions(12a, 12b) to be inserted into the lower grooves(10a) of the vanes (10), and then plating the ring portions with a brazing material, (c) making an anode cylinder(2) of a circular cross-sectional configuration by cutting a pipe or bending a sheet into a cylindrical member and precisely finishing it, (d) placing the lower strip ring having the inner and outer ring portions(12a,12b) formed in the Step(b) and the anode cylinder(2) made in the Step(c) on a base jig(20) having a plurality of circumferentially spaced longitudinal grooves(20a), (e) inserting the respective vanes(10) prepared in the Step(a) into the respective longitudinal grooves(20a) of the base jig(20), (f) fitting an antenna lead(6) with a brazing material(15) connected to its lower end as shown in FIG. 4, into the groove(10c) of one of the vanes formed in the Step(a), (g) then, assembling in sequence a center pin jig(21), an upper strip ring having inner and outer ring portions(13a, 13b) coated with a brazing material in the same manner as the Step(b), and an upper jig(22) having a plurality of circumferentially spaced longitudinal slots(22a) formed in its peripheral wall, (h) inserting cut brazing wires(16) of given length through each slots(22a) of the upper jig(22) toward the vanes(10), and (i) passing the so obtained assembly through a heating furnace having a sufficient temperature, for example, of about 800° C.-about 950° C., to melt the brazing materials, thereby enabling the components of the assembly to be joined to each other by the molten brazing materials.

In this process, the contact surfaces between the components are joined to each other by the molten brazing material flowing into between them. More particularly, the vanes(10) are bonded to the inner wall of the anode cylinder(2) by the melt of the brazing wires(16) flowing into between them through the slots(22a) of the upper jig(22), the antenna lead(6) is bonded at its lower end to the vane(10) by the brazing material(15) attached to the lower end, and the inner and outer ring portions(12a, 12b, 13a, 13b) of the lower and upper strip rings are joined to the vanes(10) by the brazing material coated on outer surfaces of the strip rings. At this time, since the jigs, such as the base jig(20), the center pin jig(21) and the upper jig(22), used in the assembling operation are made of the material of a low thermal expansion coefficient, such as carbon or tungsten oxide, which may not be bonded to the brazing materials, joining of the jigs to the adjacent components by the brazing materials does not occur even during the heat treatment.

The prior art of manufacturing the anode assembly by the process as described above, is however disadvantageous in that the manufacturing process is tedious and time-consuming and requires higher manufacturing cost because it needs the steps of cutting the brazing material into the wires of given size used to join the vanes to the inner wall of the anode cylinder and vertically inserting the respective wires through the respective slots formed in the outer periphery of the upper jig. Such a complicated operation also results in lower productivity. Furthermore, possible incomplete insertion of the brazing materials into the given sites during the assembling operation leads to an increase of a defective. In addition, this prior method has lower productive efficiency and higher fraction defective, which result from the complicated operation of forming in advance the brazing material used for joining the antenna lead to the vane by means of a mold and a forming apparatus, and then fixing the formed brazing material to the lower end of the antennal lead.

SUMMARY OF THE INVENTION

With the foregoing drawbacks of the prior art method in view, it is an object of the present invention to provide a method of manufacturing an anode assembly of a magnetron, in which it is only necessary to plate vanes with a brazing material in order to mutually join components contiguous to the vanes without using separate brazing materials or wires and requiring plating of inner and outer ring portions of upper and lower strip rings with a brazing material.

To achieve the above object, there is provided according to the present invention a method of manufacturing an anode assembly of a magnetron, comprising the steps of forming vanes, each having ring-receiving grooves formed in its upper and lower sides, and then coating entire surfaces of the vanes with a brazing material; forming upper and lower strip rings having inner and outer ring portions, an anode cylinder of a circular cross-sectional configuration, and an antenna lead; placing the lower strip rings having the inner and outer ring portions, and the anode cylinder on a base jig having a plurality of circumferentially spaced longitudinal grooves, and also inserting the respective vanes into the respective longitudinal grooves; fitting a lower end of the antenna lead into a lead-receiving groove formed in one of the vanes; continually, assembling in sequence a center pin jig, the upper strip ring having the inner and outer ring portions an upper jig; and heat treating the obtained assembly in a heating furnace having a sufficient temperature to melt the coated brazing material on the surfaces of the vanes, thereby joining the commponents, i.e., the anode cylinder, the upper and lower strip rings and the antenna lead, contiguous to the vanes by the molten brazing material on the vanes.

In an embodiment of the present invention, preferably, the temperature of the heating furnace is in the range of about 800° C.-about 900° C.

BRIEF DESCRIPTION OF THE DRAWINGS

The invention will be more fully understood from the following detailed description thereof, taken in connection with the accompanying drawings which form a part of this application and in which:

FIG. 5 is an exploded perspective view for explaining a method of manufacturing the anode assembly according to the present invention; and FIG. 6 is an exploded perspective view of a vane and an antenna lead shown in FIG. 5.

DESCRIPTION OF THE PREFERRED EMBODIMENT

Figure 1:
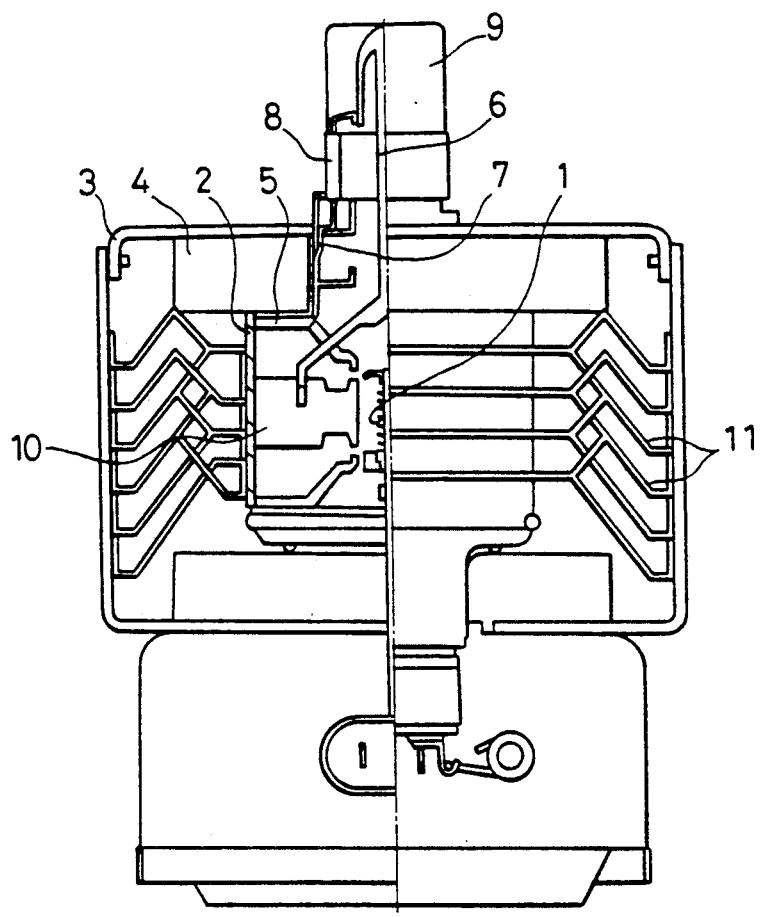
FIG. 1 is a cross-sectional view of a conventional magnetron.
Figure 2:
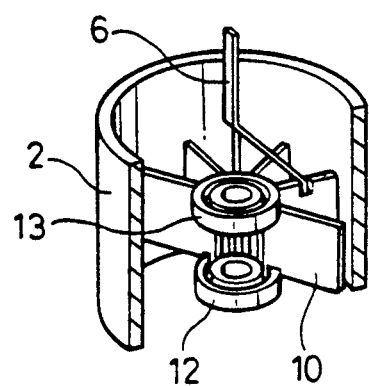
FIG. 2 is a perspective view, partially in cut away of an anode assembly of the magnetron shown in FIG. 1.
Figure 3:
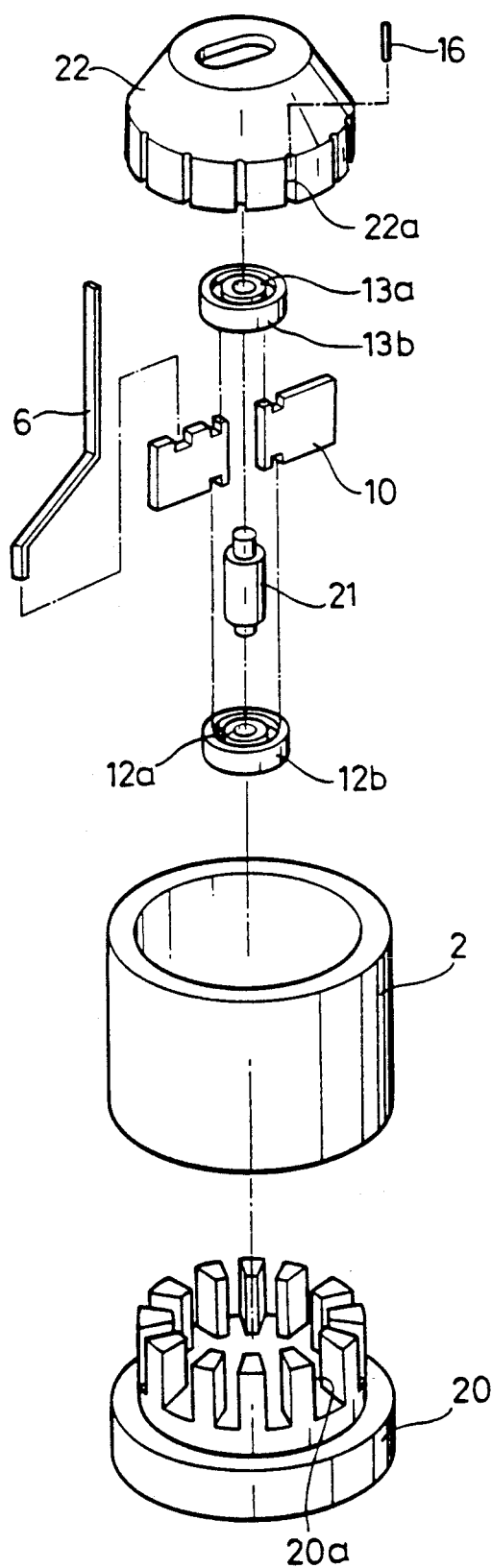
FIG. 3 is an exploded perspective view for explaining a method of manufacturing the anode assembly according to a prior art.
Figure 4:
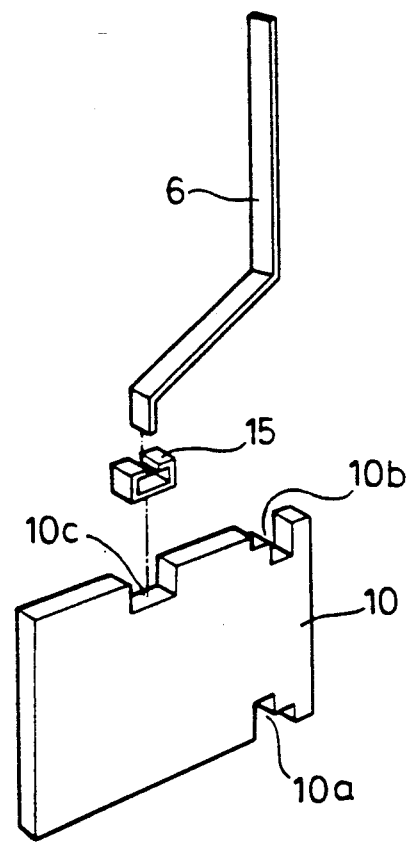
FIG. 4 is an exploded perspective view of a vane and an antenna lead shown in FIG. 3.

Referring to FIG. 5 which is an exploded perspective view for explaining a mathod of manufacturing an anode assembly of a magnetron according to the present invention, basic components, i.e., an anode cylinder(2), vanes(10), an antenna lead6), upper strip ring having inner and outer ring portions(13a, 13b) and lower strip ring having inner and outer ring portions(12a, 12b), constituting the anode assembly of the magnetron are same as those in the prior art. The parts, such as a base jig(20), a center pin jig(21) and an upper jig(22), used for assembling the above components are also same as in the prior art.

However, the major distinct differences between the present invention and the prior art are the use of the brazing material for joining the components of the assembly and the place to be coated with the brazing material. The manufacturing process according to the present invention comprises a series of the steps as described below:

(a) The rectangular plate vanes(10), each having ring-receiving grooves(10a, 10b) formed in its upper and lower sides, are formed and entire surfaces of the vanes(10) are plated with the brazing material. This step is one of the differences of the present invention from the prior art. That is, while coating of the surfaces of the vanes with the brazing material is not coating out in the prior art, the present invention comprises the vane plating operation.

(b) The lower strip ring(12) having the inner and outer ring portions(12a,12b) to be inserted into the lower ring-receiving groove(10a) of the vane(10) is formed. While the prior art comprises coating of the ring portions with the brazing material, such a coating operation is eliminated in the present invention.

(c) The anode cylinder(2) of a circular cross-sectional configuration is made by cutting a pipe or bending a sheet into a cylindrical member of a predetermined dimension and precisely finishing it.

(d) The lower strip ring(12) and the anode cylinder(2) are placed on the base jig(20) having a plurality of circumferentially spaced longitudinal grooves(20a).

(e) The vanes(10) are inserted one into each groove(20a) of the base jig(20).

(f) The antenna lead(6) is fitted into a lead-receiving groove(10c) formed in the upper side of one of the vanes(10). While in the prior art a separate formed brazing material is attached to the lower end of the antenna lead(6) before fitting of the lead, such a separate brazing material is not needed in the present invention.

(g) The center pin jig(21), the upper strip ring(13) having the inner and outer ring portions(13a, 13b) of the same configurations as those of the inner and outer ring portions of the lower strip ring, and the upper jig(22) are assembled in sequence. While in the prior art the ring portions(13a, 13b) are coated with the brazing material, such a coating operation is eliminated in the present invention. Furthermore, the upper jig(22) used in the this invention is not provided on its outer peripheral surface with such slots as in the prior art because separate brazing wires are not needed in this invention.

(h) The obtained assembly is passed through a heating furnace having a temperature of about 800° C.-about 950° C. to melt the coated brazing material on the surfaces of the vanes, thereby joining the components of the assembly.

In the process according to the present invention, joining of the contact surfaces between the components contiguous to the vanes, i.e., between the vanes and the anode cylinder(2), the vane and the lower end of the antenna lead(6), and the vanes and the inner and outer ring portions(12a, 12b, 13a, 13b) of the lower and upper strip rings are accomplished by the molten brazing material coated on the surfaces of the vanes. That is, a brazing operation of the components of the assembly may be simply and inexpensively carried out by the brazing material coated on the entire surface of the vanes, without using of the separate brazing materials or wires as employed in the prior art.

As discussed above, according to the present invention, since a quantity of the brazing wires for joining of the vanes to the anode cylinder and the separate preformed brazing material for joining of the antenna lead to the vane, as in the prior art, are not required, and thus forming and assembling operations for them may be eliminated, enhanced efficiency of a production process, mass production and reduction in costs may be achieved. In addition, since there is removed a cause of join defect resulting from misoperation liable to occur during a manual or semiautomatic operation of inserting the brazing wires for joining of the vanes to the anode cylinder into the given sites and attaching the preformed brazing material to the lower end of the antenna lead, assembly defect of the products may be eliminated or minimized, whereby improvement in quality may be accomplished.

While the invention has been shown and described with reference to a preferred embodiment thereof, it will be understood that variations and modifications in detail may be made therein without departing from the spirit and scope of the invention as defined in the appended claims.

What is claimed is:

1. A method of manufacturing an anode assembly of a magnatron used in microwave oven to generate an electromagnetic wave, the method comprising the step of:

forming vanes, each having ring-receiving grooves formed in its upper and lower sides, and then coating entire surfaces of the vanes with a brazing material;

forming upper and lower strip rings having inner and outer ring portions, an anode cylinder of a circular cross-sectional configuration, and an antenna lead, respectively;

placing said lower strip rings having the inner and outer ring portions, and said anode cylinder on a base jig having a plurality of circumferentially spaced longitudinal grooves, and also inserting the respective vanes into the respective longitudinal grooves;

fitting a lower end of said antenna lead into a lead-receiving groove formed in one of said vanes;

continually, assembling in sequence a center pin jig, said upper strip ring having the inner and outer ring portions, and an upper jig; and heat treating the obtained assembly in a heating furnace having a sufficient temperature to melt the brazing material coated on the surfaces of said vanes, thereby joining the components contiguous to said vanes by the molten brazing material on said vanes.

2. A method of manufacturing an anode assembly of a magnetron as claimed in claim 1, in which the temperature of said heating furnace is in the range of about 800° C.–about 900° C.

* * * * *